Jan. 12, 1965

J. R. GIER, JR 3,164,891

METHOD OF FORMING PIN FIN ASSEMBLIES

Filed March 2, 1960

INVENTOR.
JOHN R. GIER, JR.
BY
*Joh H. Leonard,*
*his* ATTORNEY.

Jan. 12, 1965    J. R. GIER, JR    3,164,891
METHOD OF FORMING PIN FIN ASSEMBLIES
Filed March 2, 1960                    4 Sheets-Sheet 2
Fig. 9.
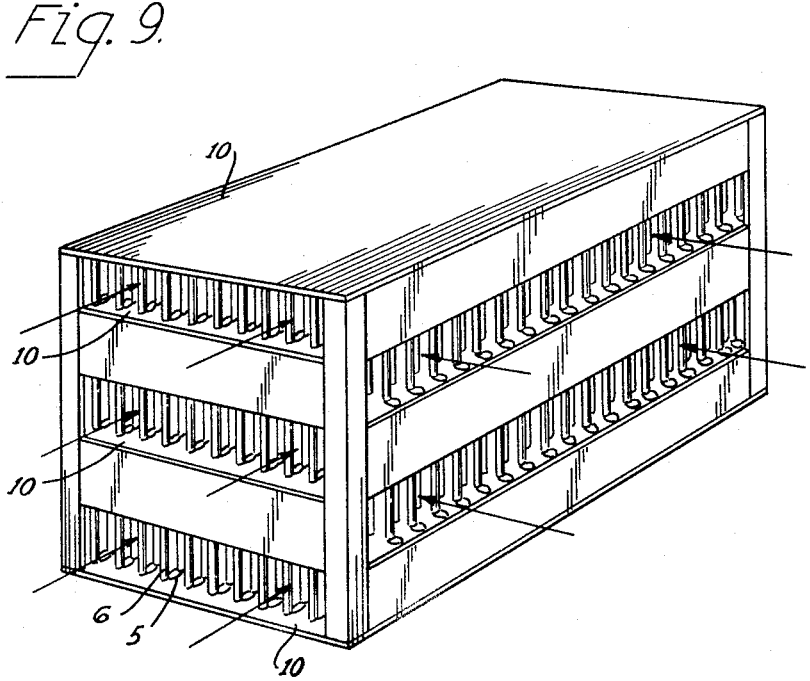
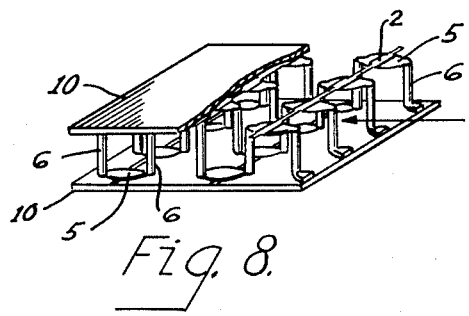
Fig. 8.
INVENTOR.
JOHN R. GIER, JR.
BY
ATTORNEY.

Jan. 12, 1965        J. R. GIER, JR        3,164,891
METHOD OF FORMING PIN FIN ASSEMBLIES
Filed March 2, 1960                        4 Sheets-Sheet 3

INVENTOR.
JOHN R. GIER, JR.
BY
ATTORNEY.

Jan. 12, 1965  J. R. GIER, JR  3,164,891
METHOD OF FORMING PIN FIN ASSEMBLIES
Filed March 2, 1960  4 Sheets-Sheet 4
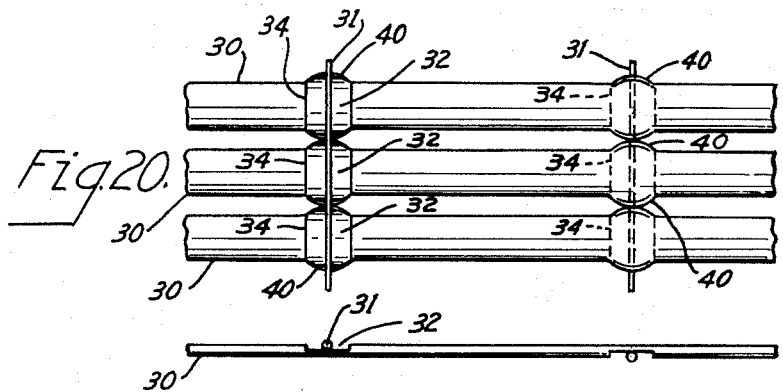
Fig. 20.
Fig. 21.
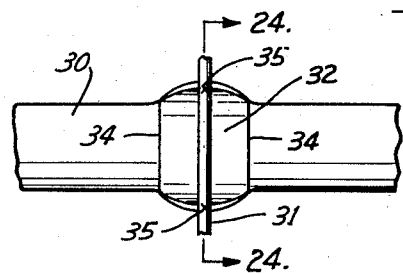
Fig. 22.
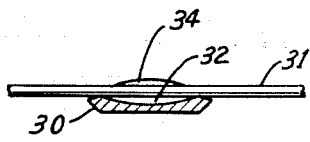
Fig. 24.
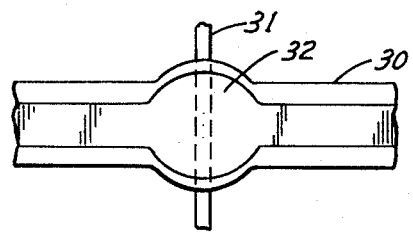
Fig. 23.
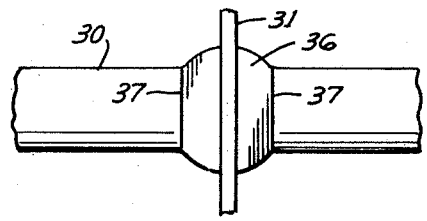
Fig. 25.
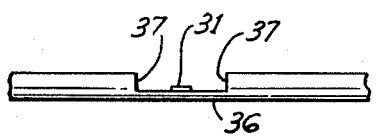
Fig. 26.
INVENTOR.
JOHN R. GIER, JR.
BY
ATTORNEY.

United States Patent Office 3,164,891
Patented Jan. 12, 1965

3,164,891
METHOD OF FORMING PIN FIN ASSEMBLIES
John R. Gier, Jr., Hines Hill Road, Hudson, Ohio
Filed Mar. 2, 1960, Ser. No. 12,448
9 Claims. (Cl. 29—157.3)

This invention relates broadly to pin fin structural components, and to a method of making the same, and particularly to pin fin heat exchangers, and constitutes an improvement in the inventions disclosed and claimed in my U.S. Letters Patent No. 2,678,808, issued May 18, 1954, and No. 2,778,358, issued January 22, 1957.

For the purposes of illustration, the invention is described herein as applied specifically to heat exchangers, its application to other structural components being apparent from the illustrative example.

As more fully described in the earlier above patent, it is desirable, in the fabrication of heat exchangers, to provide a plurality of pins arranged in a sub-assembly so that they can be disposed between adjacent faces of parallel spaced heat conducting plates and bonded properly at their ends to the plates. As therein disclosed, a length of wire of small diameter is subjected to transveres forming pressure at spaced locations along its length to distort the wire, at spaced portions, laterally of the wire axis into a series of thin, relatively wide, readily bendable ligaments arranged in a row endwise and between the ends of which lengths of the undistorted wire are connected as legs or pins. The offset of the metal of the wire to form the ligament portions is from one side of the wire past the diameter of the wire toward the other side. The wire at the ends of each ligament is sheared during the distortion of the metal into ligaments and the resultant surfaces of the pins at opposite ends of each ligament face toward each other at an abrupt angle to the face of the ligament and form the ends of the pins.

Next, the wire is formed into a somewhat sinusoidal shape with the ligaments at the crests and with the pins parallel to each other, thus exposing the ends of the pins outwardly of the assemblage at the crests of the corrugations so that they can be readily bonded directly to the plates between which parallel spaced rows of the pins are to be installed in right angular relation to the planes of the plates.

In order to position the ends of the pins and the outer faces of the ligaments in coplanar relation so that they can fit agains the flat surfaces of the confining plates conveniently, the apparatus disclosed in the second of the above patents was utilized. By that apparatus, in the final forming stages, a series of connected ligaments and pins, formed of a single length of wire bent to dispose the pins in approximate side by side spaced relation, is fed so as to dispose successive pins between successive teeth of a continuously rotated feed gear which constrains the pins to properly spaced parallel relation. While the pins are so constrained and advanced, their ends and the outer faces of the ligaments are engaged successively by flattening rollers which force the outer faces of the ligaments and the ends of the pins into coplanar relation with each other at each edge of the formed wire.

The pins thus formed and the manner in which they are formed have certain disadvantages. Expensive tooling is required for each change in the diameter, length, or spacing of the various pins desired. The machine is adapted to form only one wire at a time, forming the individual pins and ligaments successively and continuously. After the individual formation of a number of the wires, they must be assembled in side by side parallel relation to each other and held in position by additional tooling to form a mat preparatory to brazing their coplanar surfaces at the crests to the confining plates between which the mat is to be permanently installed and bonded. Furthermore, all tooling required for a particular job is special tooling having no general utility. The same is true of the machine.

One of the principal objects of the present invention is to provide a mat of pin fins of the character described in a more economical and efficient manner with conventional machinery of general utility and requiring little or no special tooling.

A specific form of the method comprises the formation of a pin fin mat by securing a plurality of straight wires, to be formed into pin fins and designated "pin wires," fixedly in a row in laterally spaced parallel relation to each other and securing them in that relation by bonding to them cross tie wires arranged to extend generally endwise of the row and transversely of the pin wires, thus forming an assembled group, and thereafter, forming the pin wires as a group into sinuous shape with the crests of the pin wires at each face of the group in alignment with each other endwise of the row of pin wires by passing the assembled group endwise of the pin wires in successive steps through suitable sets of dies in an ordinary forming press or stamping press and stamping all the wires simultaneously by dies extending the entire length of the row of pin wires at each operation of the press while controlling the amount and positioning of metal to be distorted or displaced during the initial steps in the formation of the ligaments and the end surfaces of the pin fins so that less rearrangement of the metal is necessary in the final stages of formation of the pin fins.

A specific object is to form a wire, or group of assembled wires, into preliminary sinuous shape preparatory to forming the ligament portions and, with the wires held in this preliminary shape, to notch the crests of the corrugations from their outer surfaces inwardly by distorting and displacing a portion of the metal at each crest transversely of the wire axis, from the outside of the bend inwardly toward and beyond the axis of the wire, into thin flexible ligaments, leaving the end surfaces of the pins at the ends of each ligament disposed at abrupt angles to the outer surface of the ligament thus formed, thereby providing the end faces of the resultant pins, and controlling the abruptness of the angel between the end faces of the pins and the outer face of their associated ligament portion by preselection of the abruptness of the bend at the crests.

Another specific object is to provide a method by which a pin fin arrangement of the general character described can be produced from conventional woven screen.

Another specific object is to connect the pin forming wires together prior to the formation thereof and then to form them so as to maintain dimensional accuracy between the opposite faces of the resultant mat in the case of larger wires, and to render the assembled mat easier to handle in the case of smaller wires.

Another object is to provide a pin fin heat exchanger in which the junctures between the pins and their confining plates are free from thermal constrictions.

Other objects and advantages will become apparent from the following description wherein reference is made to the drawings, in which:

FIG. 8 is a perspective view of a completed pin fin mat assembly showing it installed between the plates for use in a heat exchanger, part of the plates being broken away for clearness in illustration;

FIG. 9 is a perspective view of a heat exchanger incorporating the present mat of pin fins, part thereof being broken away for clearness in illustration of the pins and the cross tie wires and for showing the direction of flow of fluids through the exchanger;

FIGS. 20 and 21 are a top plan view and a front elevation, respectively, of a wire assembly illustrating the initial step in another modification of the invention;

FIGS. 22 and 23 are enlarged fragmentary top plan and bottom plan views, respectively, of one pin wire and one cross tie wire of the assembly of FIGS. 20 and 21;

Figure 1:
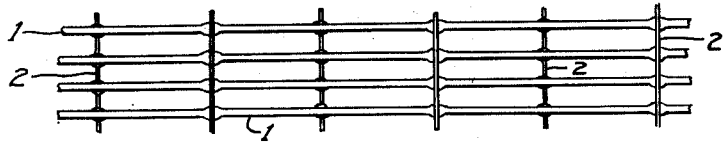
FIG. 1 is a top plan view of an assembly of pin wires and tie wires illustrating an initial step in the method of forming a pin fin mat in accordance with the present invention.

FIG. 24 is an enlarged vertical cross sectional view taken on the line 24—24 of FIG. 22; and FIGS. 25 and 26 are enlarged fragmentary top plan and front elevational views, respectively, of one pin wire and one cross tie wire of the assembly of FIGS. 20 through 24 after final notching preparatory to bending of the pin wires to sinusoidal form.

Heretofore in the formation of pin fin mats, it has been proposed that mats be made by bending individual wires into sinuous form and then, after bending, assembling the bent wires in parallel, laterally spaced relation to each other with the crests of the corrugations, at opposite faces of the assemblage, aligned endwise of the axes of the bends, and then welding to the crests of the aligned corrugations suitable tie bars or strips designed to hold the bent wires accurately and rigidly in assembled relation. However, this procedure would have certain disadvantages. In the first place, even if the wires should be bent accurately into sinuous form preparatory to the installation and welding of the cross tie bars into place on the rounded crests, the welding heat would cause distortion of the work-stressed pin wires with the result that the mat would be warped and lacking in dimensional accuracy between the faces at the ends of the pins. Since the welding was not to be succeeded by any die forming operation, the resultant irregularities in the mat faces and the dimensional inaccuracies would not be eliminated. Consequently, the mat faces could not fit the confining plates properly for effective brazing. Also, since the crests were not to be flattened and coined, there would be thermal constrictions at the junctures of the crests of the pin wires with the cross tie bars or strips.

Again, pin wires individually bent into sinuous shape prior to assembly into a mat are difficult to handle, assemble, and hold in assembled condition preparatory to installing the cross tie bars or strips.

In accordance with the present invention, these defects are eliminated by assembling the pin wires and cross tie wires and welding them together preparatory to shaping the pin wires into the sinuous form. The present method has the advantages of providing dimensional accuracy between the opposite faces of the resultant mat, particularly in the case of large diameter wires; of greatly facilitating the assembling and subsequent handling of the wires and mats in the case of both large and small diameter wires; of providing greater efficiency and speed in formation of the mats; of permitting the use of conventional presses and simple dies; and of enabling the formation of a plurality of the pin forming wires simultaneously in an accurately constrained group; of providing a mat which is free from thermal constrictions at its junctures with its confining plates; and of providing mats of sufficient rigidity for effective handling and assembling into heat exchangers yet having sufficient flexibility flatwise to accommodate itself to irregularities in the surfaces of its confining plates to facilitate brazing and to improve the quality of the resultant braze.

Figure 2:
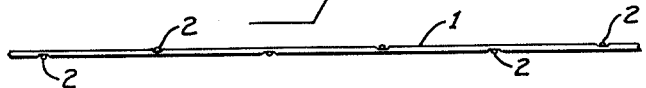
FIG. 2 is a front elevation of the assembly shown in FIG. 1.

Referring first to FIGS. 1 and 2, a plurality of pin wires 1, each of which is to be formed into a series of pins alternating with connecting ligaments arranged in a row endwise of the wire, is provided. The pin wires 1 are arranged in side by side parallel relation to each other while in straight condition and are tied together fixedly in that relation by cross tie wires 2. The cross sectional shape of the pin wires 1 may be round, lenticular, streamlined, or of any shape desired. If not round, the pin wires are disposed with their major axes endwise of the row of pin wires in a plane parallel to the opposite faces of the assemblage.

The cross tie wires 2 may be of the same size as the wires 1, but preferably are of smaller diameter or cross section. For example, the cross section of a cross tie wire may be from $\frac{1}{10}$ to $\frac{1}{20}$ the cross section of a pin wire. However, the size is not altogether controlling. The resistance of the cross tie wires to elongation, contraction, and bending is important and may be affected not only by the cross section of the cross tie wire but by the metal of which it is composed. The cross tie wires should have sufficient yields so that the assembled mat is rigid enough for ease in handling and assembly but can flex flatwise about longitudinal and transverse axes slightly so as to conform readily to the faces of the confining plates between which it is to be bonded.

The word wire is used herein in a broad sense to include not only wire as generally accepted but also rods, bands, strips, ribbons, and the like, which can be used in heat exchangers.

The wires 1 and 2 are bonded together at their intersections. This is done preferably by welding while maintaining welding heat and pressure such that the tie wires 2 are embedded in the pin wires 1, usually with a slight incidental flattening of the pin wires at their intersections with the wires 2. This disposes the cross wires 2 with their outermost surfaces substantially coplanar with the outermost flattened surfaces of the pin wires 1 with which they are in contact at their junctures therewith. Preferably, adjacent cross wires 2 are spaced lengthwise of the pin wires 1 and arranged alternately at opposite faces of the assemblage at locations such that, when the wires 1 are formed into final form, those of the cross tie wires 2 at one face of the assembly will be at the outside surfaces of the crests or ligaments of the assembled group of pin wires 1 at that face of the group, and the cross wires 2 at the opposite face of the assembly will be at the outside surfaces of the crests or ligaments at the latter face.

After the pin wires 1 are thus assembled in parallel relation in laterally spaced relation to each other and tied together firmly by the cross tie wires 2, the subsequent successive steps are performed.

Figure 3:
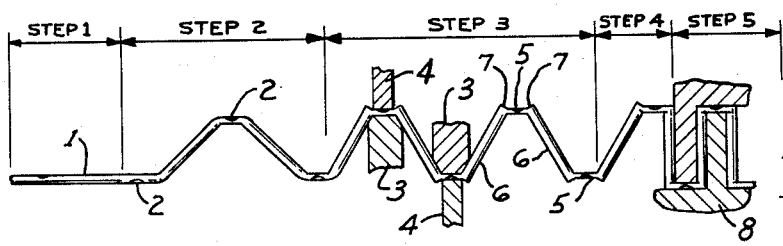
FIGS. 3 and 4 are an enlarged diagrammatic front elevation and an enlarged top plan view, respectively, illustrating a plurality of succeeding steps of the method.
Figure 4:
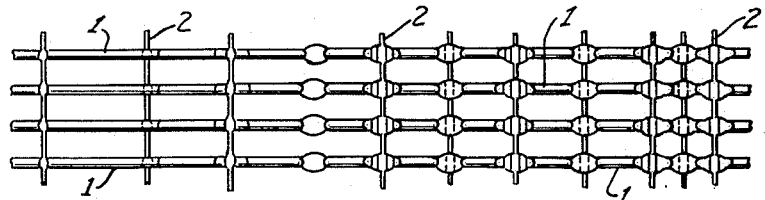

As illustrated in FIGS. 3 and 4, and indicated as step 1, the wires 1 are fed as a group endwise of the pin wires 1 into suitable dies in a conventional forming press progressively so that the cross tie wires 2 will be disposed at the crests of the pin wires 1 when the pin wires are formed by the dies 3 into sinuous shape.

Here it is to be noted that the word "sinuous" as used herein is used in a broad sense to describe a wire which is bent, drawn, gathered, or otherwise shaped so that lengthwise it extends to and fro across a longitudinal median line with alternate crests at opposite sides of the median line. It does not matter whether the crests are rounded, whether the wire is zig-zag in shape with angular apices or sinusoidal, or whether the crests are lineal and extend at abrupt angles to the axes of the wire portions which they join as, for example, in step 5 in FIG. 3. The portions of the wire between alternate crests may be straight or curved. The wires are bent as a group into sinuous form, as illustrated in step 2, in the first step. Next, the pin wires 1 are advanced to positions in the dies 3 wherein follow-up punches 4 notch the opposite crests of the wires 1, each from the outside of its crest inwardly of the bend of the crest while the intermediate portions of the pin wires 1 are held by the dies 3.

The actions of the dies 3 and punches 4 are such that the metal of each pin wire, at the crest engaged, is distorted and displaced transversely of the axes of the pin wire 1, from the outermost surface of the bend at the crest toward and beyond the axis of the wire, into a thin, relatively wide ligament 5 which is connected at its opposite ends to pins 6 which comprise the adjacent undistorted portions of the original pin wire 1. The metal of the original wire provides ends 7 of the legs or pins 6 which result from the shearing and displacing of the ligament metal. The ends 7 face toward each other and are disposed at abrupt angels to the outer face of their associated ligament 5.

After this step, the pin wires, as a group, are advanced endwise of the wires for the next step in which suitable coining dies 8 in the press engage the wires 1 and finally position the pins 6 at the desired angle, usually a right angle, to the outer face of the ligaments 5 and flatten and coin the outer faces of the ligaments and the ends 7 of the pins, and dispose the ligament faces and the ends 7 of the pins 6 coplanar, thus providing a shape such as illustrated at step 4 in FIG. 3.

In this connection it is to be noted that the set of dies 3 and set of dies 8 are movable relative to each other endwise of the direction of feed to effect a gathering step indicated at step 4 in FIG. 3. This gathering step is essentially the gathering step performed by the apparatus of my above Patent No. 2,778,385, except that all of the pin wires 1 are gathered simultaneously. Briefly, the gathering is effected by moving the sets of dies 3 and 8 toward each other along the path of feed while they are in closed position so that the ungripped portion of the wires 1 therebetween buckle and fold, due to the resultant oppositely directed pressures applied at the ends of the portions, about the junctures of the pins 6 with the ligaments 5.

Figure 5:
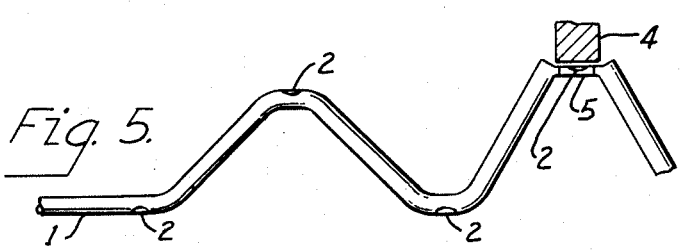
FIG. 5 is an enlarged fragmentary front elevation of a length of one of the wires illustrating in greater detail certain initial steps illustrated in FIGS. 3 and 4.
Figure 6:
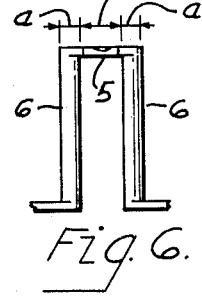
FIG. 6 is an enlarged fragmentary front elevation of a length of wire illustrating in greater detail the step 5 of FIGS. 3 and 4.
Figure 7B:
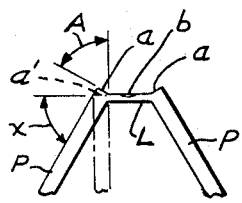
FIGS. 7A and 7B are diagrammatic illustrations of fragments of wire illustrating certain controlling relations between the end faces of the pins and their associated ligaments used for purposes of control of metal displacement during final forming.
Figure 7A:
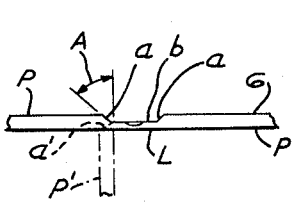
Figure 10:
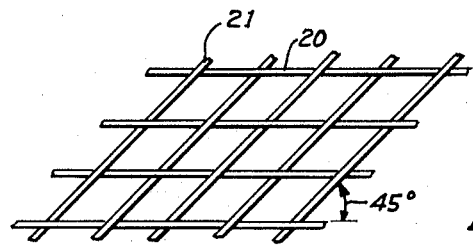
FIG. 10 is a top plan view of a wire assembly illustrating an initial step in a modification of the present method.
Figure 12:
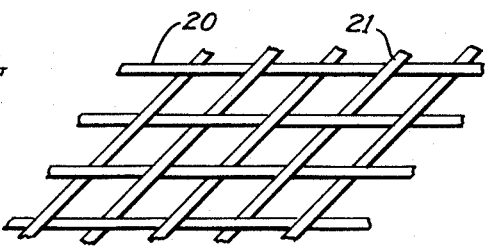
FIG. 12 is a top plan view showing the assembly of FIG. 10, following a succeeding step in the modified procedure.
Figure 11:
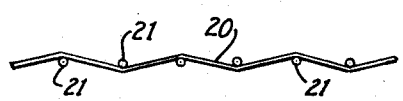
FIG. 11 is a front elevation of the assembly illustrated in FIG. 10.
Figure 13:
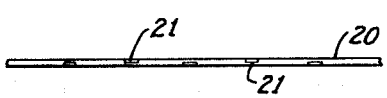
FIG. 13 is a front elevation of the assembly illustrated in FIG. 12.
Figure 14:
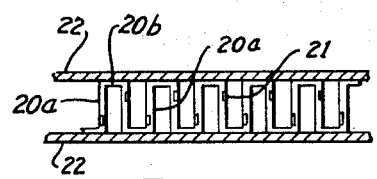
FIGS. 14 and 15 are a fragmentary vertical sectional view and a right end elevation, respectively, of a heat exchanger employing the pin fin mat formed from the assembly illustrated in FIGS. 10 through 13.
Figure 15:
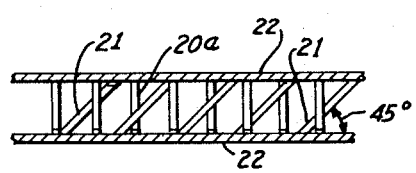

At this point, it is to be noted that certain advantages result from bending the wire into the so-called sinusoidal shape preparatory to the notching operation. For example, as illustrated in FIGS. 7A and 7B, when a punch or die strikes a wire radially of the wire, there is a flow of the displaced metal laterally of the path of the punch away from the punch. If the wire is straight, as illustrated in FIG. 7A, the end faces of the wire, as indicated at $a$ in FIG. 7A, are at an angle A plus 90° to the outer face $b$ of the resulting ligament. If, then, the resultant pins P are bent to dispose their axes at right angles to the outer face $b$ of the ligament L, as indicated by dotted lines $p'$, then the faces $a'$ are not co-planar with the outer face $b$ but slope relative thereto in a direction lengthwise of the pins $p$ and outwardly away from the plane of the face $b$. Consequently, a substantial amount of metal must be displaced in order to re-form and coin the metal at the crests into the form illustrated in step 5 of FIGS. 3 and 5. To withstand the coining deformation without bending of the pins $p$, the pins $p$ must be closely confined and this requires expensive dies.

If the pin wire is first bent into sinuous shape, then, as illustrated in FIG. 7B, the end surfaces $a$ of the pins $p$ still spread only to substantially the same angle A plus 90° relative to surface $b$ and hence at the same angle A to a plane normal to the outer surface $b$ of the ligament L. However, due to pre-bending the wire 1, the axes of the pins $p$ in FIG. 7B are already at a substantial angle $x$ to the outer surface $b$ of the ligament L. Consequently, they do not have to be swung as far to dispose their axes at 90° to the surface $b$. Hence, if a pin $p$ is positioned so that its axis is at a right angle to the surface $b$, the surface $a'$ is more nearly parallel to, or coplanar with, the surface $b$.

Thus, by preselecting the degree of curvature of the crests of the pin wire, or divergence of the axes of the pins 6 joined by a crest, preparatory to the notching operation, the end faces 7 of the pins 6 can be so disposed relative to the outer surface of their ligament 5 that when the pins 6 are at the desired angle to their ligament 5, their end surfaces 7 and the outer surface of the ligament 5 will be substantially coplanar. Thus, by proper control, there is very little metal to displace and rearrange during the final forming operation in the press dies. This is a distinct advantage because the pins do not have to be confined to the degree which would be necessary were heavy coining necessary at the ends. This simplifies both die construction and maintenance.

After the pre-assembled group of wires has been formed as a group in the manner described, they are disposed, as illustrated in FIGS. 8 and 9, between suitable confining plates 10 in the manner described in my U.S. Letters Patent No. 2,678,808. In this relation, fluids can flow either endwise of the row of pin forming wires 1 or transversely thereof, since the tie wires are of relatively small diameter and project from the surfaces of the plates 10 only sufficiently to assist in reducing objectionable laminar flow.

Generally, if the pin forming wires 1 are to be streamlined or lenticular in cross section, they are assembled so that the long axes of their cross sections extend endwise of the row and parallel to the faces of the assemblage. In such cases, the flow is parallel to the major axes of the pins and thus endwise of the tie wires.

Referring next to FIGS. 10 through 15, another modification of the invention is illustrated which is particularly adapted for mats of fine wire. In the structure heretofore described, the cross tie wires 2 are shown as directed at right angles to the length of the pin wires 1. However, as mentioned, the tie wires 2 may be biased to the length of the pin wires 1 and this arrangement has certain advantages, particularly in the case of very small diameter wires having little rigidity.

If the tie wires are to be arranged in this manner, the structure illustrated in FIGS. 10 through 15 is very effective. In this form, a wire screen, in which the longitudinal wires 20 are to be pin wires and cross wires 21 are to be tie wires, is provided. This screen may be the ordinary window screen, or wire fence, or a specially made screen in which the meshes are either right angled or oblique parallelograms. The cross tie wires may be of smaller or the same diameter as the longitudinal wires 20. Preferably, a screen with square or rectangular mesh is preferred. The screen is stressed to make the meshes oblique parallelograms. With the wires 20 and 21 thus forming a screen with meshes in the form of oblique parallelograms, the wires 20 and 21 are bonded together by welding or brazing so as to hold them firmly in fixed position relative to each other. Also, they are rolled or pressed so as to flatten the individual wires. The flattening may be done either before or after the welding or brazing operation, but preferably precedes brazing or welding, as the heat of welding or brazing relieves work hardening strains imparted by the flattening operation.

After the wires are thus flattened and bonded, the longitudinal pin wires 20 are in parallel relation to each other and the cross tie wires 21 are in parallel relation to each other but extend at a bias to the lengths of the pin wires 20. In this condition, the pin wires 20 are bent as a group so that each wire 20 is in the form of alternate pins 20a and ligaments 20b. In accordance with the method hereinbefore described, the result is a plurality of pin wires 20 in a row in laterally spaced relation to each other, and each pin wire 20 provides a series of alternate pins and ligaments which are aligned with those of the other pin wires 20 in a direction transversely of the pin wires 20. When the pin wires 20 are thus bent, they may be brazed at the ends of the pins and outer faces of the ligaments between the plates 22, in the manner described in U.S. Patent No. 2,678,808 and hereinbefore. When disposed in this manner, the cross tie wires 21 extend on a bias to the length of the pins 20a and thus at an oblique angle to the surfaces of the plates 22. These cross tie wires extend entirely to the opposite faces of the resultant pin fin mat and hence from one confining plate 22 to the other, and even along the plate surfaces across the ligaments. As a result, not only do they tie the pins 20a accurately together and hold the mat in proper condition for handling, and reinforce it by giving a rectangular bracing structure, but also, since they extend from one plate 22 to the other on a bias to the length of the pins 20a, they also act as heat conducting pins which conduct heat directly to the plates 22. This greatly increases the pin surface provided without increasing the weight and is particularly advantageous where weight is a factor—they are on a bias, they reduce laminar flow of the fluids passing through the spaces between the plates at right angles to the rows of pins 20a. Their merit is pronounced in the case of very fine wires for low temperature applications wherein fine wires are permissible.

The tie wires 21 are bonded to the plates 22, to the pin portions 20a, and to the ligaments 20b with a good thermal bond so that there are no thermal constrictions at the junctures.

In this connection, it is to be noted that the screen illustrated in FIGS. 10 through 15 is shown as a conventional wire screen using single longitudinal wires 20 and single cross tie wires 21. However, the screen may be one in which the cross tie wires 21 are dual wires arranged in pairs looped about opposite sides of each wire 20 and twisted at their portions between the wires 20 so as to hold the wires 20 rigidly in position. In fact, wide variations in the type of screens or grids formed of wire for use in the method are permissible, but woven wire screen is effective, very inexpensive, and readily available. The use of wire screen is particularly advantageous both from the standpoint of strength and thermal efficiency and convenience in manufacture and assembly, especially in a case of the very small diameter pin fins. Screen with wires as small as .012 to .014 inch in diameter, or less, may be used.

If desired, for some purposes, the screen may be formed into pin fins without first rendering the meshes oblique parallelograms, for example, when the tie wires lie at the crests or, if laminar flow is secondary, extend parallel to the mat faces at the sides of the pins.

Figure 16:
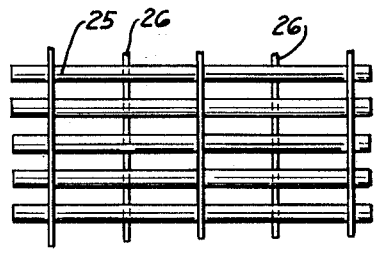
FIGS. 16 and 17 are a top plan view and a right end elevation, respectively, of an assembly of pin wires and cross wires illustrating another modification of the present method.
Figure 17:
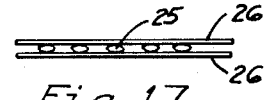
Figure 18:
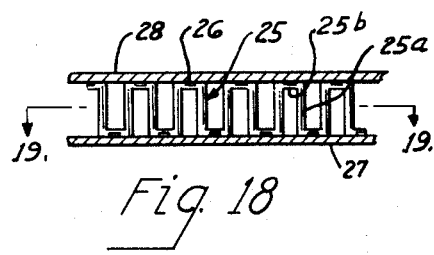
FIG. 18 is a fragmentary front elevation showing the assembly of FIG. 16 after being formed into a mat and bonded between confining plates.
Figure 19:
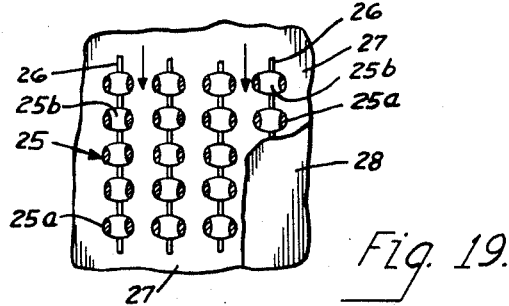
FIG. 19 is a vertical sectional view taken on the line 19—19 in FIG. 18.

As illustrated in FIGS. 16 through 18, there is shown a grid or screen made of longitudinal pin wires 25 with cross tie wires 26, the pin wires 25 being of lenticular or streamlined cross section. The tie wires 26 preferably are arranged so that they fall at the opposite crests of the wires 25 when the wires 25 are formed into shape to provide pin fins 25a and ligaments 25b. As illustrated, this assemblage is bent about axes parallel to the major axis of the lenticular cross sections of the wires 25, thus generally flatwise of the wires 25. The assemblage thus bent is arranged so that the cross tie members therefor extend parallel to the major axes of the cross sections of the resulting pin fins 25a, as illustrated in FIG. 19, whereby the flow of air between the pin fins is parallel to the cross tie wires 26.

Thus, this present method has a specific distinct advantage over the prior method described in the above patents in connection with streamlined pins, in that therein it was necessary to impart the streamlined cross sections to the pins after forming the pins, whereas, in accordance with the present invention, the pin wires can be rolled to the desired lenticular or streamlined cross section preparatory to forming them into pins.

The group of wires 25 thus formed into pins and ligaments are disposed between confining plates 27 and 28 and bonded thereto as a unit by brazing. After the original assemblage of the straight wires, all of the operations thereon are performed on the wires as a group and the group of wires is handled and set between the plates as a group and bonded thereto.

Referring to FIGS. 20 through 26, a modified assembly and method is provided wherein the pin wires are notched in flat condition and a different technique from that of FIGS. 7A and 7B is employed for controlling the relation between the end faces of the pins and their associated ligaments.

In this modification, pin fin wires 30 of streamlined or lenticular cross section are notched by punches arranged to displace the metal predominantly laterally of the wires at portions which are to provide ligaments.

The notches, indicated at 32, are in the form of short troughs extending endwise of the pin wires. They are shallow and concave in cross section, preferably being curvilinear about axes extending lengthwise of the wires. They have end walls 34 which are upright.

Each notch is first formed by a single blow of a punch having a lower rounded end configured to define the notch. When the pin wire is struck with the punch, most metal displacement is laterally of the wire, any displacement endwise of the wire being slight. Hence, the end walls 34 are almost upright.

The tie wires 31 are laid on the pin wires so as to extend across the open tops of the notches 32. Since the tie wires bridge across the notches and the pin wires are lenticular in cross section, each tie wire spanning a notch 32 engages the associated pin wire at opposite lateral limits of the notch. The tie wires can readily be tack-welded to the pin wires at these locations, indicated at 35, and under the heat of welding, mashed into the notches, if desired, as illustrated in FIG. 24.

Next, the assembly of pin wires and cross tie wires is struck in dies to flatten the notched portions into flat, thin, readily bendable ligaments 36, the end faces 37 of which are upright and normal to the faces of the ligaments 36. There is only a slight displacement of the metal of the ends 34 of the notches. The tie wire portions spanning the notches are flattened in this forming operation.

The resultant assemblage is then bent as a unit into sinusoidal form such as is indicated generally in FIG. 18, but wherein the faces of the ligaments offset by die forming become the outer faces of the crests and the end faces 37 become coplanar with the outer faces of the ligaments without requiring much metal displacement in the final operation.

Since most of the displacement of the metal of the pin wires is effected before applying the tie wires, the final operation is mostly a flattening or mashing operation in which the metal moves at right angles to the length and width of the pin wires. As a result, there is little lateral displacement of the metal of the pin wires or tie wires laterally of the pin wires. Therefore, the pin wires can retain the spacing given them at the time of tack welding the tie wires 31 thereto without the tie wires being forced to elongate or buckle.

Further, as illustrated in FIGS. 20 through 26, the notching operation may be carried out so that the metal of the pin wires or rods is displaced laterally at the notches to the extent that the edges 40 of each wire 30 at the notched portions are in contact with corresponding edges 40 of the notched portions of adjacent wires 30. If desired, this can be deliberately effected and certain advantages obtained thereby. In such cases, the wires 30, illustrated in FIG. 20, are passed through multiple dies which notch a plurality of them concurrently prior to the addition of the cross tie wire 31. While the wires 30 are held in the assembled condition, as illustrated in FIG. 20, the cross tie wires are welded thereto by a multiple head welder. The heated cross tie wires are thus mashed by the welder into the wires 30. The operation, when performed in this sequence, has the advantage that the cross tie wires are not in any manner weakened by the notching operation. Furthermore, the heat of welding after the cold working of the wires 30 to form the notches anneals and removes the cold work hardening strains caused by the notching operation, thus making the metal wires 30 easier to form. Furthermore, the cross tie wires 31 do not have to stretch or buckle to accommodate themselves to changes in dimensional spacing and effects caused by the forming of the notches. For example, if the tie wire 31 is applied before notching, then when the lateral edges of the metal forming the notches approach more closely to each other during notching, the tie wire 31 between the two edges tends to buckle.

Again, in many cases, the cross tie wire 31 can be omitted entirely. In such instances, a group of the wires 30 are run through a gang die or multiple die and the notches formed as hereinbefore described, but with such a degree of pressure that the lateral spread of the metal causes the lateral edges 40 to engage each other. While held in this condition, for example, when feeding the wires endwise in a group through a multiple die, the lateral edges 40 of adjacent wires 30 can be tack welded together, using an electrode, resistance, or arc weld while the wires are held in the die. The heat being supplied from the welding operation also relieves cold working strains caused by the notching operation. This operation can be performed at the initial notching operation or subsequent notching operation in which the metal at the notched portions is flattened into thin ligaments.

In some instances, the wires may be hot formed and kept at a sufficient temperature so that, when notched in dies or rollers, the edges of the displaced metal engage each other with sufficient pressure to weld together under the heat originally imparted to the wires 30, thus forming a bond sufficiently strong to hold the wires 30 in the proper position for forming into sinusoidal form in a group. In such procedure, likewise, there is no work hardening. While still hot, the metal can be passed to forming dies for finishing the forming operation. In each of these instances, described in connection with FIGS. 20 through 26, the steps 3 through 5 described in connection with FIG. 3 may be followed for the finishing operation.

This provides a uniform and accurate structure, and one which can be produced efficiently with conventional equipment.

Having thus described my invention, I claim:

1. The method of forming a pin fin assembly comprising securing a plurality of straight pin wires fixedly in a row, with at least the major portion of their lengths in laterally spaced parallel relation to each other, by cross tie wires laterally spaced from each other and extending generally transversely of the pin wires thereby to form an assembled generally planar group of pin wires held in fixed position relative to each other by the tie wires, thereafter forming the pin wires concurrently as a group into a mat in which each of the pin wires is sinuous, with alternate oppositely disposed crests and pin portions therebetween, and with the crests at each face of the mat arranged in straight rows, which rows are spaced endwise of the length of the pin wires from each other, and, during said forming operation, while the pin wires are bent into said sinuous shape, notching successively each row of crests of the pin wires by distorting a portion of the metal of each wire at each crest in a given row transversely of the wire from the outside of the bend beyond the diametral plane of the wire, thereby to form the crests into thin flexible ligaments joining adjacent pins with the end surfaces of the pin portions exposed by the notching operation disposed at abrupt angles to the outer faces of their associated ligaments, and thereafter subjecting the crests to an additional forming operation to render the outer faces of the ligaments coplanar, to dispose the pin portions at an abrupt angle to the coplanar outer faces of the ligaments, and to dispose the pin ends coplanar with said coplanar outer faces of the ligaments.

2. The method according to claim 1 including additionally arranging the cross tie members so that they extend bias to the lengths of the pin wires preparatory to forming the pin wires into pins.

3. The method of forming a length of wire into a series of alternate flattened, thin ligaments and pins connected at their adjacent ends to the ends thereof, and comprising bending the length of wire transversely of its length into sinuous shape with curvilinear crests and, while it is held in said shape, notching the wire at the crests by distorting a portion of the metal at each crest transversely of the wire from the outside of the bend toward and beyond the axis of the wire into a thin flexible ligament and leaving end surfaces of the pin portions at each end of each ligament facing toward each other and at abrupt angles to the outer face of their associated ligament, preparatory to final forming, and controlling the abruptness of said angles by controlling the abruptness of the curve of the crests, at the time of notching.

4. The method of forming a pin fin assembly from a wire screen and comprising stressing the screen in one dimension in its plane to cause the wires to intersect at acute and obtuse angles to each other so that the meshes are in the form of oblique sided parallelograms, bonding the wires fixedly together while the meshes are in said form, then bending the screen into sinuous shape about parallel axes extending transversely of the longitudinal wires and parallel to the plane of the screen so that the crests of each longitudinal wire form ligaments with pins therebetween, and the said ligaments are aligned in rows extending endwise of the row of longitudinal wires, and the cross tie wires extend along said rows of pins bias to the length of the pins.

5. The method according to claim 4 including the step of pressure flattening the wires of the screen while the meshes are in the form of oblique parallelograms and prior to said bonding step.

6. The method of forming a pin fin assembly and comprising forming a wire screen of longitudinal wires and cross wires with the meshes in the form of oblique sided parallelograms, bonding the wires together while so formed, then bending the assembled group into sinuous shape about parallel axes extending transversely of the longitudinal wires and parallel to the plane of the screen so that the crests of each longitudinal wire are curvilinear and form ligaments with pins therebetween, and the ligaments are aligned in rows extending endwise of the row of longitudinal wires and the cross wires extend along said rows of pins bias to the lengths of the pins, notching the wires of the screen at the crests of the corrugations by distorting a portion of the metal of each crest transversely of the surface of the screen from the outside toward the inside of the crests before final shaping of the crests, and then die forming the notched portions into thin flat ligaments.

7. The method of forming a pin fin assembly preparatory to bending the pin wires thereof into sinusoidal shape, comprising punch forming notches in each of a plurality of straight pin wires at spaced locations along its length by displacing the metal at such locations predominantly laterally of the wires and laterally of the direction of application of the punching force, arranging the wires in a row in parallel relation to each other with the notches aligned endwise of the row and the portions between the notches spaced apart laterally of the wires, disposing tie wires endwise of the row at said locations, whereby each tie wire intersects aligned ones of the notches, tack welding the tie wires to the pin wires at the edges of the notches to hold the pin wires in assembled relation, then flattening the pin wires at the notches into thin ligaments by displacing the metal at the notches predominantly in the direction in which the punching force was applied.

8. The method according to claim 7 wherein substantially all displacement of the metal laterally at the notches is effected by the punch forming of the notches.

9. The method of forming a pin fin assembly preparatory to bending the pin wires thereof into sinusoidal shape and comprising forming an assembly of wires wherein the wires are in parallel spaced relation to each other and are heated to welding temperature, and while they are so assembled and at said temperature, concurrently punch forming notches therein at spaced locations along their lengths by displacing the metal at such locations predominantly laterally of the wires and laterally of the direction of the application of the punching force under sufficient pressure to cause the lateral edges of the displaced metal at aligned notches to engage and weld together.

References Cited in the file of this patent
UNITED STATES PATENTS

| | | |
|---|---|---|
| 2,338,444 | Lachman | Jan. 4, 1944 |
| 2,678,808 | Gier | May 18, 1954 |
| 2,701,130 | Boestad | Feb. 1, 1955 |
| 2,722,048 | Gier | Nov. 1, 1955 |
| 2,778,385 | Gier | Jan. 22, 1957 |
| 2,814,470 | Peterson | Nov. 26, 1957 |
| 2,869,222 | Whistler | Jan. 20, 1959 |
| 2,892,618 | Holm | June 30, 1959 |
| 2,940,162 | Sandberg | June 14, 1960 |

FOREIGN PATENTS

| | | |
|---|---|---|
| 484,636 | Canada | July 8, 1952 |
| 25,289 | Netherlands | Oct. 15, 1931 |

OTHER REFERENCES

Elkonite advertisement, The Welding Engineer, 219–10, August 1929, page 2.